United States Patent
Mathai et al.

(10) Patent No.: US 11,685,256 B2
(45) Date of Patent: Jun. 27, 2023

(54) POWERTRAIN MOUNT ROLL RESTRICTOR WITH RUBBER ELEMENTS IN COMPRESSION

(71) Applicant: FORD GLOBAL TECHNOLOGIES, LLC, Dearborn, MI (US)

(72) Inventors: Thomas Mathai, Farmington, MI (US); Kevin Stark, Windsor (CA); Lin Zhu, Canton, MI (US); Yuvraj Khairate, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 17/161,972

(22) Filed: Jan. 29, 2021

(65) Prior Publication Data

US 2022/0242228 A1 Aug. 4, 2022

(51) Int. Cl.
| | |
|---|---|
| *B60K 17/06* | (2006.01) |
| *F16H 57/028* | (2012.01) |
| *F16H 57/025* | (2012.01) |
| *B62D 21/02* | (2006.01) |

(52) U.S. Cl.
CPC .............. *B60K 17/06* (2013.01); *B62D 21/02* (2013.01); *F16H 57/025* (2013.01); *F16H 57/028* (2013.01)

(58) Field of Classification Search
CPC ...... B60K 17/06; B60K 5/1208; B60K 5/125; B60K 5/1291; B60K 17/04; F16H 57/025; F16H 57/028
See application file for complete search history.

(56) References Cited

U.S. PATENT DOCUMENTS

| | | | | |
|---|---|---|---|---|
| 1,731,837 | A | * 10/1929 | Wood ................... | B60K 5/1208 403/220 |
| 4,206,661 | A | * 6/1980 | Horstmann .............. | B60K 5/00 181/204 |
| 4,232,563 | A | * 11/1980 | Peterson ................. | B64C 27/35 416/114 |
| 4,641,810 | A | * 2/1987 | Ott ........................ | F16F 1/3615 248/638 |

(Continued)

FOREIGN PATENT DOCUMENTS

KR 100828692 B1 * 5/2008 ........... F16H 57/028

*Primary Examiner* — Frank B Vanaman
(74) *Attorney, Agent, or Firm* — Vincent Mastrogiacomo; Brooks Kushman P.C.

(57) ABSTRACT

A powertrain torque roll restrictor includes a first bracket having an elongated body defining a first bracket opening at a distal end and a central axis, a second bracket coaxial with and adjacent to the first bracket, and a third bracket coaxial with and adjacent to the second bracket opposite from the first bracket, with the third bracket defining a third bracket opening cooperable with the first bracket opening. The second bracket defines a second bracket opening receiving the elongated body such that the second bracket is positioned about the elongated body. The powertrain torque roll restrictor further includes a first rubber element positioned between the first bracket and the second bracket, and a second rubber element positioned between the second bracket and the third bracket, with the brackets being configured to hold the respective rubber element in compression.

18 Claims, 6 Drawing Sheets

(56) References Cited

U.S. PATENT DOCUMENTS

| | | | |
|---|---|---|---|
| 6,460,822 B1* | 10/2002 | Lee | B60K 5/1208 |
| | | | 248/638 |
| 9,212,716 B2* | 12/2015 | Yoon | F16F 15/08 |
| 9,707,836 B2 | 7/2017 | Sykes | |
| 9,707,838 B2 | 7/2017 | Sykes et al. | |
| 10,436,279 B2 | 10/2019 | Kim | |
| 10,723,213 B2 | 7/2020 | Sykes et al. | |
| 2006/0255516 A1* | 11/2006 | Dickson | F16F 3/093 |
| | | | 267/141.1 |
| 2017/0122401 A1* | 5/2017 | Coldwell | B60K 5/1208 |

\* cited by examiner ized given package constraints such that it is large enough to allow sufficient rubber volume to meet attribute and durability requirements, while also meeting metal strength and joint capacity criteria.

POWERTRAIN MOUNT ROLL RESTRICTOR WITH RUBBER ELEMENTS IN COMPRESSION

TECHNICAL FIELD

The present application is directed to a powertrain roll restrictor for a motor vehicle, and more particularly, a powertrain roll restrictor in compression.

BACKGROUND

Automotive powertrains, which generally comprise an engine and transaxle, utilize roll restrictors for limiting the powertrain roll motion due to the reaction of the powertrain torque and unwanted rotation of the engine and transaxle about a central axis. This central axis may be aligned with the engine's crankshaft center axis or may be positioned parallel thereto. Conventional automotive powertrain roll restrictors utilize brackets for attaching the restrictor to the transaxle or engine.

A powertrain roll restrictor has a variety of functions, including simultaneously isolating engine excitation forces at both idle (small force preloads) and wide open throttle (large force preloads), while also controlling powertrain roll during highly transient dynamic events. These requirements require the roll restrictor to allow displacement with a low rate of change of stiffness. In addition, the roll restrictor may be designed given package constraints such that it is large enough to allow sufficient rubber volume to meet attribute and durability requirements, while also meeting metal strength and joint capacity criteria.

Conventional torque roll restrictors (TRR) include the main rubber element (MRE) working in shear. This conventional shear type TRR delivers a linear stiffness rate, however as displacement increases, the durability of the rubber may be compromised, requiring thicker rubber sections in the TRR. Furthermore, conventional shear type roll restrictors include the rubber bonded to the metal of the bracket, for example, by molding the rubber directly onto the bracket components with an applied adhesive to ensure adequate bond strength.

SUMMARY

According to one or more embodiments, a powertrain torque roll restrictor includes a first bracket having an elongated body defining a first bracket opening at a distal end and a central axis, and a second bracket coaxial with and adjacent to the first bracket. The second bracket defines a second bracket opening receiving the elongated body such that the second bracket is positioned about the elongated body. The powertrain torque roll restrictor further includes a first rubber element positioned between the first bracket and the second bracket, the first rubber element having a drive compressed state between the first bracket and the second bracket upon travel in a drive direction. The powertrain torque roll restrictor also includes a third bracket coaxial with and adjacent to the second bracket opposite from the first bracket, with the third bracket defining a third bracket opening cooperable with the first bracket opening, with a second rubber element positioned between the second bracket and the third bracket. The second rubber element has a reverse compressed state between the second bracket and the third bracket. upon travel in a reverse direction. The third bracket is secured to the first bracket via a fastening element extending through the third bracket opening and into the first bracket opening defined in the elongated body.

According to at least one embodiment, the first rubber element may have a hardness different from the second rubber element. In one or more embodiments, the second bracket may have a first surface on the first bracket side and a second surface on the third bracket side, each of the first surface and the second surface defining a respective cavity for receiving the respective first and second rubber elements therein. In further embodiments, the first surface may have an inner edge about the second bracket opening having a sloped surface adjacent to and contacting the first rubber element when in the compressed state. In other further embodiments, the first surface may have an inner edge about the second bracket opening having a stepped surface adjacent to and contacting the first rubber element when in the compressed state. In yet other further embodiments, the first surface may have an axially raised outer edge having a radially inward facing protrusion contacting the first rubber element. In at least one embodiment, the third bracket may include a base portion defining the third bracket opening and elongated members extending from opposing ends of the base portion. In certain further embodiments, the elongated members may each define a respective coaxial fastener opening for receiving a fastener to secure the third bracket to a roll restrictor bracket. In one or more embodiments, the first rubber element may be radially wider than the second rubber element.

According to one or more embodiments, a vehicle powertrain assembly includes a transmission housing, a vehicle sub-frame, and a powertrain torque roll restrictor for securing the transmission housing to the vehicle sub-frame. The powertrain torque roll restrictor includes a first bracket having an elongated body defining a first bracket opening at a distal end and a central axis; a second bracket coaxial with and adjacent to the first bracket, with the second bracket defining a second bracket opening receiving the elongated body such that the second bracket is positioned about the elongated body. The second bracket also defines attachment openings radially outward from the second bracket opening. The powertrain torque roll restrictor also includes a first rubber element positioned and configured to be compressed between the first bracket and the second bracket, and a third bracket coaxial with and adjacent to the second bracket opposite from the first bracket. The third bracket defines a third bracket opening cooperable with the first bracket opening and secured to the first bracket via a fastening element extending through the third bracket opening and into the first bracket opening defined in the elongated body, and has a securing portion defining a fastener opening for receiving a fastener to secure the third bracket to the transmission housing. The powertrain torque roll restrictor further includes a second rubber element positioned and configured to be compressed between the second bracket and the third bracket. The second bracket is secured to the vehicle-subframe by fasteners disposed through the attachment openings.

According to at least one embodiment, the vehicle powertrain assembly may further include a roll restrictor bracket positioned between the third bracket and the transmission housing, the roll restrictor bracket having a first portion secured to the third bracket at the fastener opening, and a second portion secured to the transmission housing. In at least one embodiment, the first rubber element may have a hardness different from the second rubber element. In one or more embodiments, the second bracket may have a first surface on the first bracket side and a second surface on the third bracket side, each of the first surface and the second surface defining a respective cavity for receiving the respective first and second rubber elements therein. In certain further embodiments, the first surface may have an inner edge about the second bracket opening having a sloped surface adjacent to and contacting the first rubber element when compressed. In other further embodiments, the first surface may have an inner edge about the second bracket opening having a stepped surface adjacent to and contacting the first rubber element when in the compressed state. In yet other further embodiments, the first surface may have an axially raised outer edge having a radially inward facing protrusion contacting the first rubber element. In one or more embodiments, the third bracket may include a base portion defining the third bracket opening and elongated members extending from opposing ends of the base portion.

According to one or more embodiments, a powertrain torque roll restrictor includes a first bracket having an elongated body with a distal end and a stud molded to the elongated body extending from the distal end, the first bracket and stud defining a center axis, and a a second bracket coaxial with and adjacent to the first bracket, with the second bracket defining a second bracket opening receiving the elongated body such that the second bracket is positioned about the elongated body. The powertrain torque roll restrictor also includes a first rubber element positioned and configured to be compressed between the first bracket and the second bracket, and a third bracket coaxial with and adjacent to the second bracket opposite from the first bracket. The third bracket defines a third bracket opening cooperable with the first bracket opening. The torque roll restrictor also includes a second rubber element positioned and configured to be compressed between the second bracket and the third bracket. The third bracket is secured to the stud via fastening elements positioned axially on either side of the third bracket such that the stud extends through the third bracket opening to secure the third bracket to the first bracket.

According to at least one embodiment, the first rubber element may have a hardness different from the second rubber element. In one or more embodiments, the second bracket may have a first surface on the first bracket side and a second surface on the third bracket side, each of the first surface and the second surface defining a respective cavity for receiving the respective first and second rubber elements therein.

DETAILED DESCRIPTION

Figure 1:
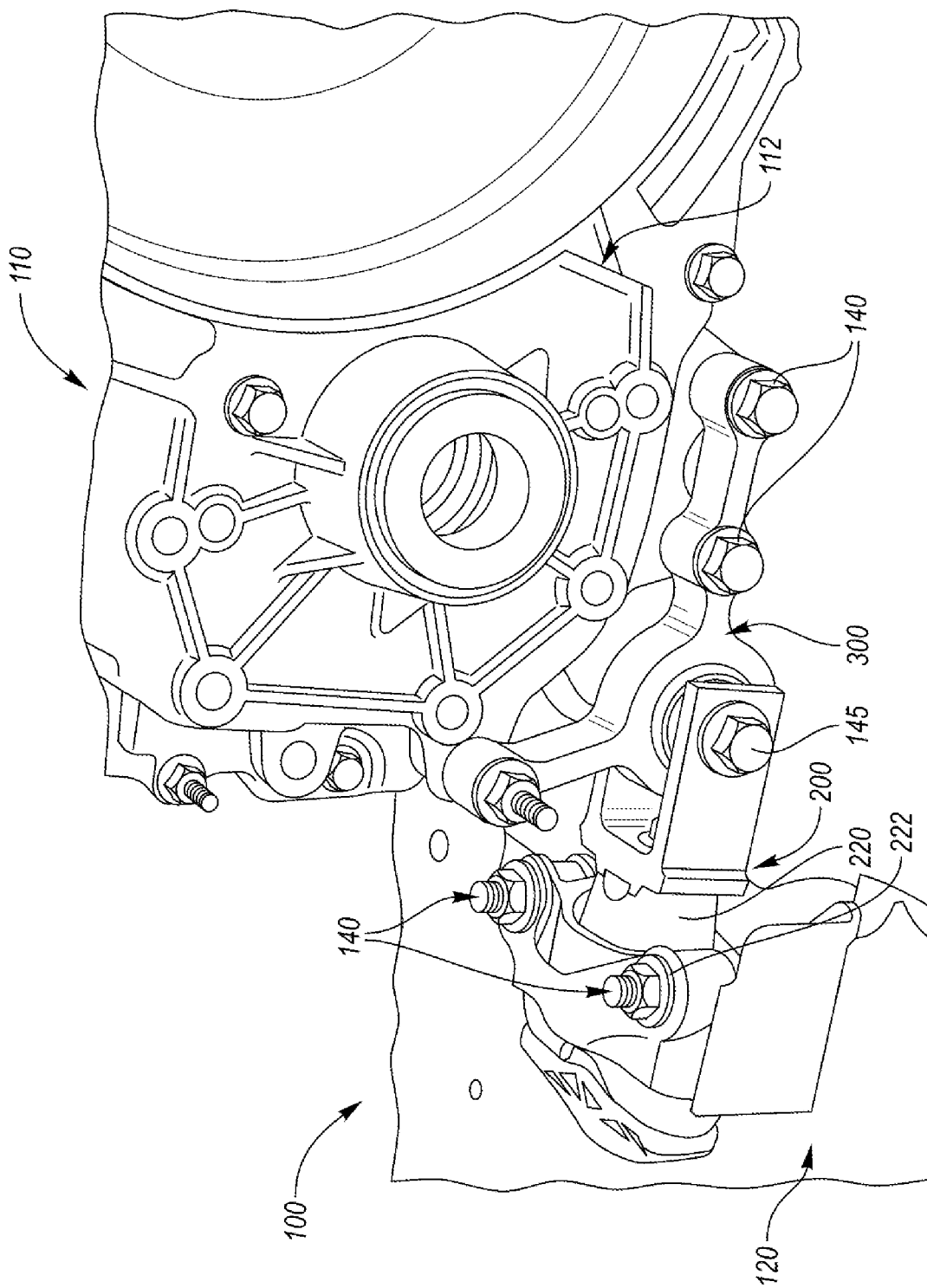
FIG. 1 is a partial perspective view of a vehicle underbody with a roll restrictor, according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about". The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic (e.g., with respect to degrees of offset from an angle when referring to substantially perpendicular or parallel). Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

According to one or more embodiments, an automotive powertrain assembly includes a torque roll restrictor (TRR) with separate drive and reverse main rubber elements being held in compression in an axial direction between bracket components. As such, the construction of the torque roll restrictor is modular such that the metal brackets and main rubber elements can be interchanged and modified and used in combination to achieve tailored characteristics required for a particular powertrains across various platforms. The rubber elements being held in compression allows for more durability than rubber held in shear due to the compressive load over the shear load, where rubber may tear over time. Furthermore, when the main rubber element is shear loaded, the shear load is in both directions (i.e., with the powertrain in drive and reverse). Separating the main rubber elements into a drive main rubber element and a reverse main rubber element allows for each main rubber element to be loaded only in compression and only for a portion of the time when compared with conventional shear main rubber elements. As such, the main rubber elements can be made with less material than conventional shear main rubber elements, which reduces cost and weight compared to shear TRRs, without compromising performance. Additionally, because the rubber elements are held in compression, there is no need to bond the rubber to the adjacent bracket, manufacturing cycle time can be reduced, and adhesives are not needed, thus further reducing cost.

Referring to FIG. 1, an example of an automotive powertrain 100 for a vehicle is shown. The automotive powertrain 100 includes a transmission housing 110, having a transmission case cover 112, and a vehicle sub-frame 120. The transmission housing 110 is secured to the front sub-frame 120 via a roll restriction system. The roll restriction system includes a compression torque roll restrictor 200 secured to the front sub-frame 120 by fasteners 140. The compression roll restrictor 200 comprises components that will be described in detail with respect to FIG. 2, including a middle bracket 220 defining openings 225 sized to receive the fasteners 140 to attach the compression torque roll restrictor 200 to the front sub-frame 120. The compression torque roll restrictor 200 includes a rear bracket 230 defining an opening sized to receive a roll restrictor bracket 300 therein, which is secured to the rear bracket 230 by a fastening element 145, such as, for example, a bush. The roll restrictor bracket 300 is secured to the transmission case cover 112 by the fasteners 140 to absorb torque and movement of the transmission housing 110 during vehicle operation, and absorbs torque by responding in the forward/aft direction (Z-axis). The restrictor 200 isolates vibration and limits vibration from the powertrain to the subframe 120. The roll restrictor bracket 300 may include any number of fasteners 140 for securing the roll restrictor bracket 300 to the transmission case cover 112, and may have any suitable shape based on cooperation with the transmission case cover 112, and the depiction of three discrete fastening locations is not intended to be limiting.

Figure 2:
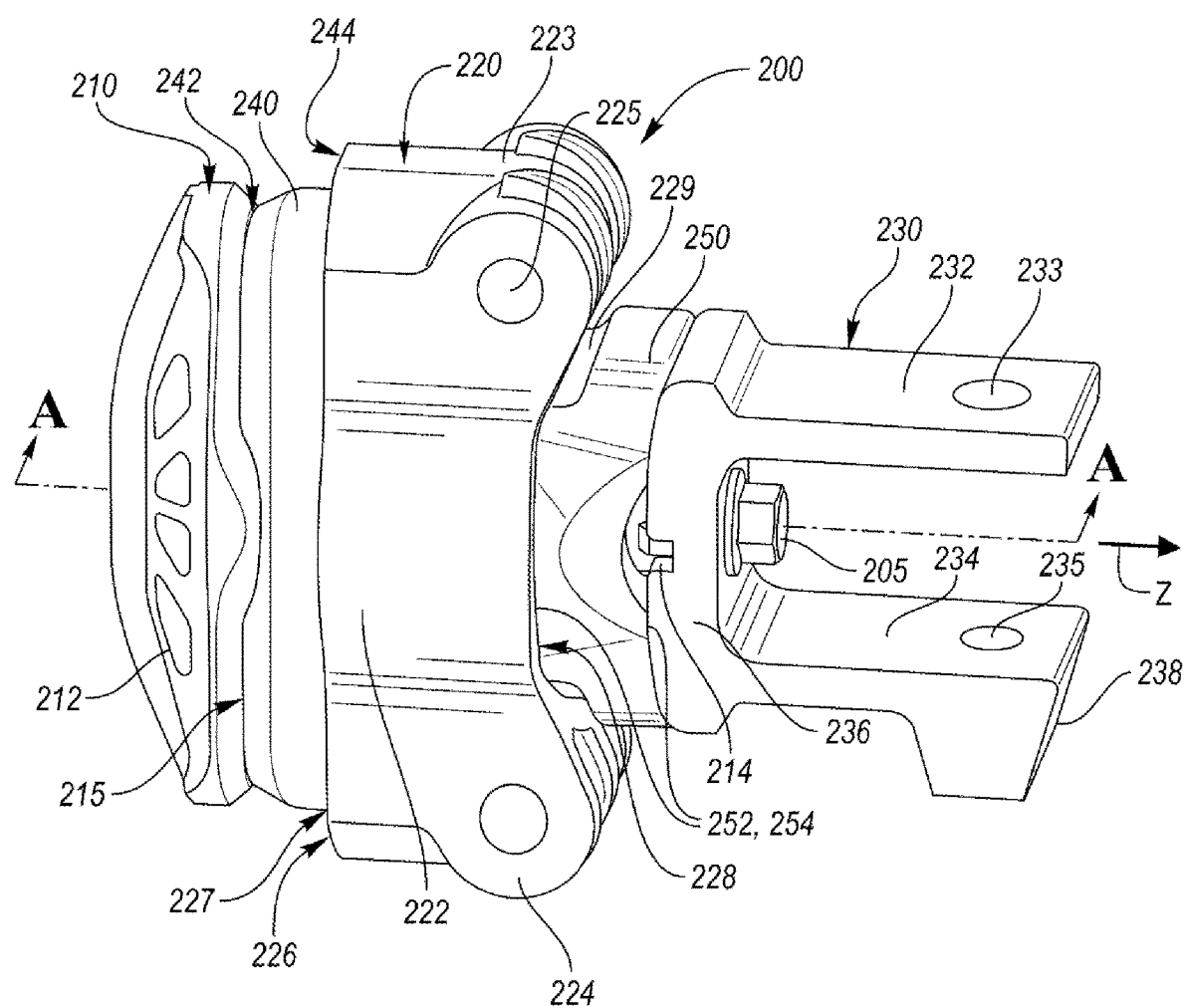
FIG. 2 is a perspective view of a compression torque roll restrictor, according to an embodiment.
Figure 3:
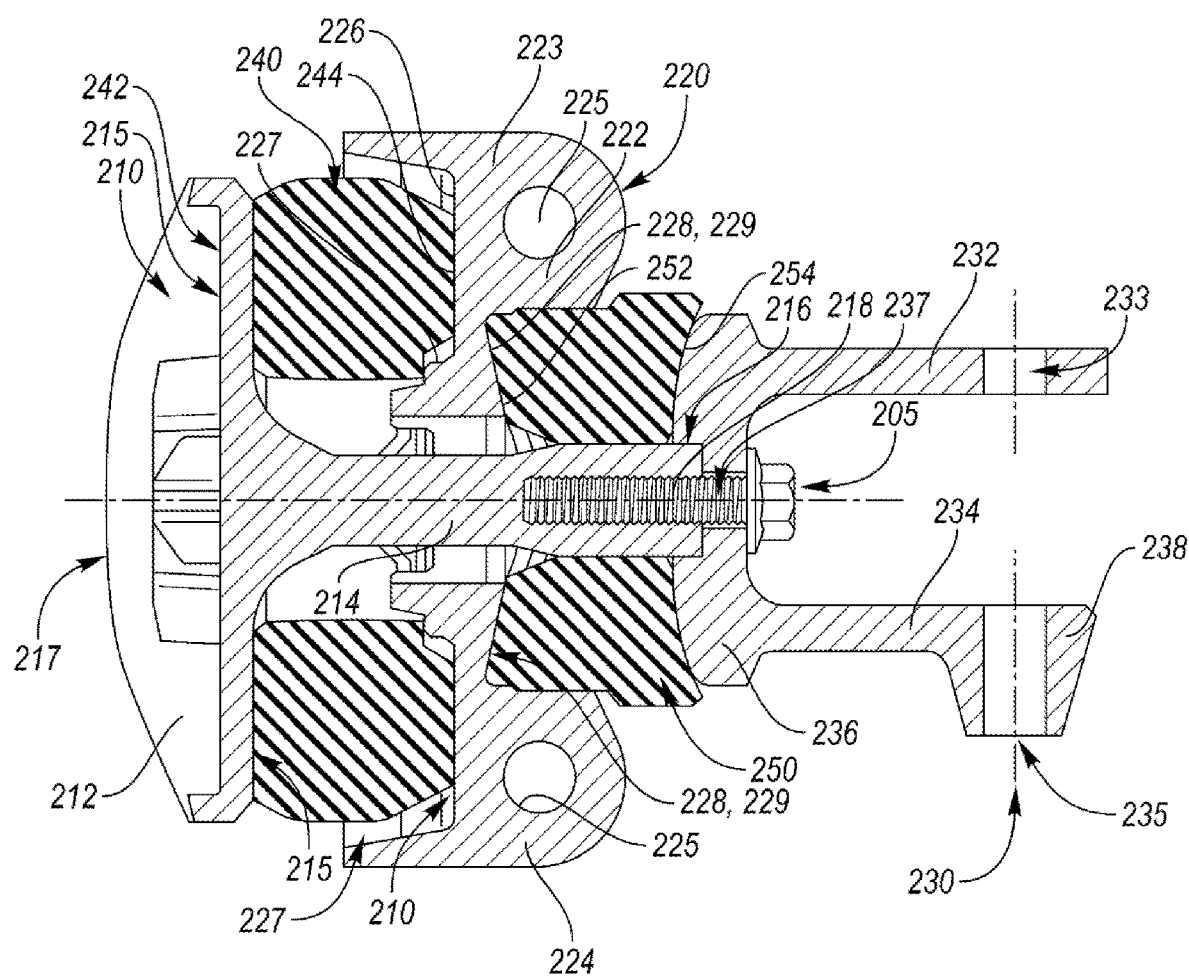
FIG. 3 is a cross-sectional view of the compression torque roll restrictor of FIG. 2, taken along plane A-A'.

Referring to FIG. 2 and FIG. 3, the compression torque roll restrictor 200 is shown in detail, according to an embodiment. The compression torque roll restrictor 200 includes a forward bracket 210, such as, for example, a T-bracket with a head portion 212 and an elongated body 214 defining a center axis Z of the torque roll restrictor 200. Although the forward bracket 210 is shown as a T-bracket, any suitable bracket is contemplated based on the powertrain progression and durability requirements for the vehicle design. The head portion 212 side of the forward bracket 210 is referred to the forward direction of the center axis Z, with the elongated body 214 extending in the rearward direction with respect to the center axis Z. The head portion 212 is positioned toward the forward (or drive) end of the center axis Z, with the elongated body 214 extends toward the rear (or reverse) end, forming the distal end 216 of the forward bracket 210. The head portion 212 includes an outer surface 213 on the forward side with respect to the center axis Z, and an inner surface 215 facing the rear direction. The elongated body 214 defines an opening 218 therein and exposed at the distal end 216, with the opening 218 being sized to receive a fastener 205, which may be any suitable fastener, such as, but not limited to, a bolt or a screw.

The compression torque roll restrictor 200 further includes a middle bracket 220 and a rear bracket 230 axially spaced from the forward bracket 210 along center axis Z, with the middle bracket 220 being positioned along the center axis Z between the head portion 212 of the forward bracket 210 and the rear bracket 230. The middle bracket 220 has a body 222 defining a central opening 221 sized to receive the elongated body 214 therein such that the middle bracket 220 is supported on the forward bracket 210 about the elongated body 214. The body 222 includes opposing end portions 223, 224 defining openings 225 for receiving the fasteners 140 therethrough to secure the middle bracket 220 to the front sub-frame 120. The body 222 has a drive-side surface 226 defining a drive-side cavity 227 facing the inner surface 215 of the forward bracket 210, and a reverse-side surface 228 defining a reverse-side cavity 229 facing the rear bracket 230. In certain embodiments, as will be discussed in detail below, the drive-side cavity 227 has a larger volume than the reverse-side cavity 229. In certain embodiments, the drive-side cavity 227 (and, in some embodiments, the drive element therein) may be about 1 to 10 times the size of the reverse-side cavity 229 (and the reverse side element therein) based on the torque being higher in the drive direction. Although shown as a particular shape in the Figures, the middle bracket 220 may be any suitable bracket type as required by the vehicle design and powertrain progression and durability requirements. The rear bracket 230 is positioned at a rearward end of the compression torque roll restrictor 200, and a base portion 236 defining an opening 237 which is axially aligned with the opening 218 in the elongated body 214. The rear bracket 230 has a C-shaped body having generally parallel elongated members 232, 234 extending from the base portion 236 and defining a space therein for receiving the roll restrictor bracket 300 therebetween. The base portion 236 is positioned adjacent the distal end 216 such that the fastener 205 can secure the rear bracket 230 to the forward bracket 210 via the opening 237. One of the elongated members, shown as elongated member 234, may have a widened end region 238 with treading therein, however any shaped region 238 is contemplated for different types of fasteners, such as, for example, for receiving a nut to cooperate with the fastening element 145. The elongated members 232, 234 each define a corresponding opening 233, 235 which are coaxial and configured to receive the fastening element 145 therethrough for securing the rear bracket 230 to the roll restrictor bracket 300 (not shown in FIGS. 2-3). Although a C-bracket is depicted as the rear bracket 230, any suitable bracket type may be utilized for the rear bracket 230 as based on the vehicle design and powertrain progression and durability requirements, and the depiction of a C-bracket is not intended to be limiting.

Figure 4:
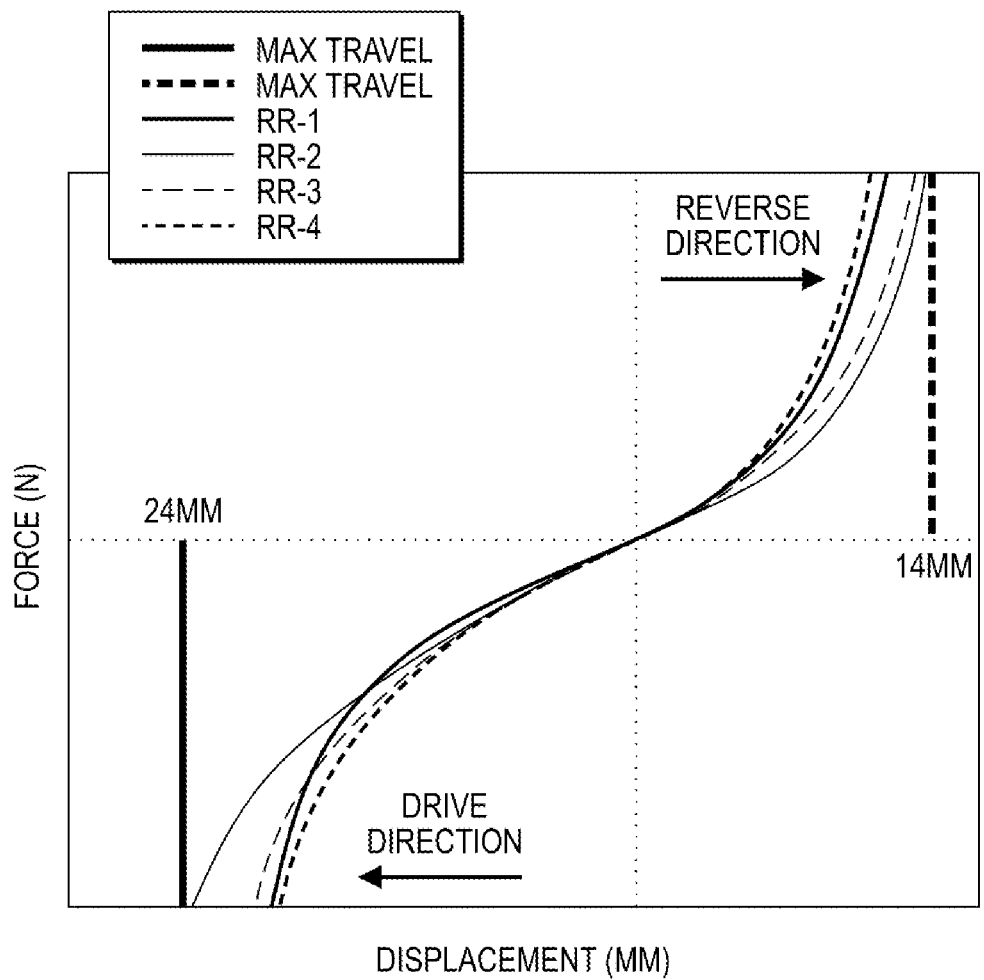
FIG. 4 is a graph showing the travel displacement of compression torque roll restrictors according to various embodiments.

The compression torque roll restrictor 200 further includes a drive main rubber element 240 and a reverse main rubber element 250 spaced axially along the center axis Z. Although particular shapes for the main rubber elements are shown in FIGS. 2-3, any suitable shape may be selected as based on progression requirements for the vehicle design, and the shapes are not intended to be limiting and examples of variations in the shapes and cooperation with the brackets will be discussed with reference to FIGS. 5A-E. Furthermore, the drive main rubber element 240 and the reverse main rubber element 250 may have any suitable size, as based on progression requirements for the vehicle design and the size of the roll restrictor 200. In certain examples, the drive main rubber element 240 may have a thickness in the Z-direction of 10 to 50 mm, in other embodiments, 15 to 45 mm, and in yet other embodiments, 20 to 40 mm. Furthermore, in certain examples, the reverse main rubber element 240 may have a thickness in the Z-direction of 10 to 50 mm, in other embodiments, 15 to 45 mm, and in yet other embodiments, 20 to 40 mm. In some embodiments, the drive main rubber element may be thicker than the reverse main rubber element, and in other embodiments, the reverse main rubber element may be thicker than the drive rubber element, as dependent on the progression and displacement of the roll restrictor and the compression observed of the rubber elements. In certain examples, the drive main rubber element 240 may have a radial thickness in the axial direction of 75 to 150 mm, in other embodiments, 85 to 145 mm, and in yet other embodiments, 95 to 140 mm. Furthermore, in certain examples, the reverse main rubber element 240 may have a thickness in the axial direction of 50 to 100 mm, in other embodiments, 55 to 95 mm, and in yet other embodiments, 60 to 90 mm. In some embodiments, the drive main rubber element may be thicker in the axial direction than the reverse main rubber element, and in other embodiments, the reverse main rubber element may be thicker in the axial direction than the drive rubber element, as dependent on the progression and displacement of the roll restrictor and the compression observed of the rubber elements. The drive and reverse main rubber elements have sufficient hardness such that they are compressed (with respect to center axis Z) when in the corresponding direction (drive or reverse) between the corresponding brackets of the compression torque roll restrictor 200, resulting in a travel displacement/progression, which is representative of the increase in stiffness of the rubber elements as the element is subjected to the load displacement. As shown in FIG. 4, a plurality of progression curves are shown for various elements. For each curve, the slope indicates the stiffness of the rubber element. As can be seen in FIG. 4, on the displacement curve, the slope (i.e., the stiffness) changes upon displacement. This stiffness may be, in some embodiments, related to the hardness of the drive and reverse main rubber elements as contacted between fixed middle bracket and displacement of the C bracket (as shown by the maximum travel of displacement in FIG. 4). In certain embodiments, the drive main rubber element and the reverse main rubber element may have differing hardness, and in other embodiments have the same hardness. The hardness of the main rubber elements (as measured by ASTM D2240). may be independently, in some embodiments, from 35 to 70 Shore A, in other embodiments 40 to 65 Shore A, and in yet other embodiments, 45 to 60 Shore A, and may be varied based on stiffness requirements and dynamic stiffness-to-static stiffness ratio requirements of the vehicle design.

The drive main rubber element 240 is positioned between the head portion 212 of the forward bracket 210 and the middle bracket 220, with the drive main rubber element 240 being disposed within the drive-side cavity 227 of the middle bracket 220. The reverse main rubber element 250 is positioned between the middle bracket 220 and the base portion 236 of the rear bracket 230, with the reverse main rubber element 250 being disposed within the reverse-side cavity 229. The drive main rubber component 240 has a front surface 242 contacting the inner surface 215 of the head portion 212 of the forward bracket 210, and a rear surface 244 contacting the drive-side surface 226 of the middle bracket 220. The main rubber component 240 is thus held as the middle bracket 220 is displaced during movement of the vehicle such that the main rubber component 240 absorbs the torque and vibration. Similarly, the reverse main rubber component 250 has a forward surface 252 contacting the reverse-side surface 228 of the middle bracket 220, and a rearward surface 254 contacting an axially forward side of the base portion 236 of the rear bracket 230, to absorb displacement of the restrictor. Thus, the body 222 of the middle bracket 220 holds both the drive main rubber element 240 and reverse main rubber element 250. As such, the drive main rubber element 240 interacts with the forward bracket 210, and is compressed between the forward bracket 210 and the middle bracket 220 to provide progression in the driving direction, and the rear bracket 230 interacts with the reverse main rubber element 250, and is compressed between the rear bracket 230 and the middle bracket 220 to provide progression in the reverse direction. Each of the forward, middle, and rear brackets 210, 220, 230 are shaped according to the shapes of the drive main rubber element 240 and the reverse main rubber element 250, and as previously discussed, the depiction of particular shapes of the brackets and the rubber elements is not intended to be limiting, and the shapes of the rubber elements may be selected based on the vehicle design and the progression requirements and performance requirements of the vehicle.

It is further contemplated according to various embodiments that modifications in the shapes, materials, and interfacing surface area of the main rubber elements (drive and reverse) and each of the brackets are contemplated in order to meet powertrain progression and durability requirements. The progression curves showed in FIG. 4 are examples of the potential functional characteristics with a modular set of parts for the compression torque roll restrictor disclosed herein. Each individual force-displacement curve represents varying characteristics (e.g., rubber elements, or cavity shapes/contact surfaces) which will affect the performance of the roll restrictor in the mounting system. Certain particular variations will be discussed in FIGS. 5A-C, however additional modifications are also contemplated based on the desired response of the roll restrictor, and this discussion is not intended to be limiting. For example, the thickness of the drive main rubber element or the reverse main rubber element in the direction of the center axis Z may impact the travel displacement and progression. Similarly, the width in the radial direction of the drive main rubber element and the reverse main rubber element with respect to the center axis Z may be selected based on the vehicle design requirements. Furthermore, the surface area contact between interfacing brackets and the corresponding main rubber element can be modified in order to meet progression and durability requirements based on the vehicle design. As can be seen in the Figures, the drive main rubber element and the reverse rubber element can have differing geometries, and it is contemplated that in certain embodiments, the drive and reverse main rubber elements may be similarly sized, configured or shaped, and in other embodiments (as in the Figures), may have different shapes, configurations and sizes. Similarly, the shapes of the brackets can be adjusted based on the installation package of the powertrain assembly such that the travel displacement can be modified in both the drive and reverse directions. Alternatively, instead of changing the geometries of brackets and main rubber elements, increasing or decreasing the hardness of the main rubber elements will change the torque roll restrictor stiffness, travel displacement, and durability. Furthermore, although the brackets are shown as metal parts, the materials are interchangeable with other suitable materials to meet the characteristic requirements of the torque roll restrictor. Accordingly, various modifications are contemplated herein, and depictions of particular arrangements and examples are not intended to be limiting.

Figure 5:
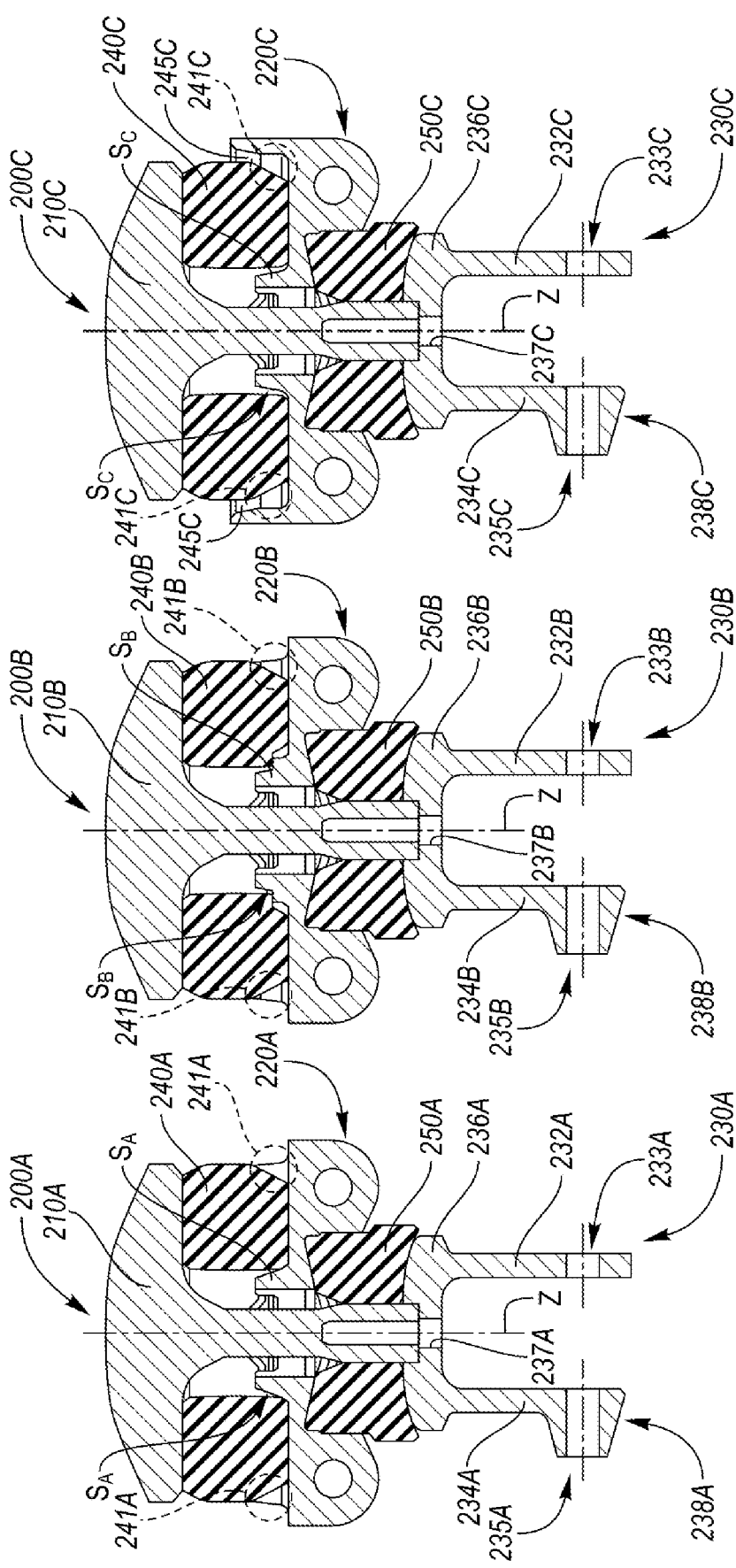
FIGS. 5A, 5B, and 5C show cross-sectional views of compression torque roll restrictors with the rubber element and drive-side cavity inner edge having sloped geometries, the drive-side cavity inner edge having a stepped geometry, and the drive-side cavity having a raised outer edge with a protrusion, respectively.

With reference to FIGS. 5A-C, further examples of compression torque roll restrictors are shown according to various embodiments. Reference numerals and components are similar to those described in FIGS. 2-3, and as such, will be used similarly hereinafter with brief reference to the common features, and discussion of the variations between embodiments will be provided in detail. Referring to FIG. 5A, the compression torque roll restrictor 200a includes a forward bracket 210a, a middle bracket 220a, and a rear bracket 230a disposed about the center axis ZA, with the drive main rubber element 240a disposed between the forward bracket 210a and the middle bracket 220a, and the reverse main rubber element 250a disposed between the middle bracket 220a and the rear bracket 230a. The shape of the edges at the rear surface 244a of the drive main rubber element 240a may be selected to contact the contours of the drive-side surface 226a when positioned in the drive-side cavity 227a of the middle bracket 220a, thus changing the progression of the compression torque roll restrictor. The contours of the drive-side surface 226a of the middle bracket 220 also can change the progression of the compression torque roll restrictor. As can be seen in FIG. 5A, the drive main rubber element 240a includes a sloped edge 241a contacting the outer edge of the drive-side cavity 227a. Furthermore, in FIG. 5A, the inner edge of the drive-side cavity 227a has a sloped surface SA about the elongated body 214, and adjacent the drive main rubber element 240a. The sloped surface SA and the sloped edge 241a cooperate to contain the main rubber element 240a upon compression, thus increasing in stiffness more quickly.

Referring to the example of FIG. 5B, the compression torque roll restrictor 200b includes a forward bracket 210b, a middle bracket 220b, and a rear bracket 230b disposed about the center axis $Z_B$, with the drive main rubber element 240b disposed between the forward bracket 210b and the middle bracket 220b, and the reverse main rubber element 250b disposed between the middle bracket 220b and the rear bracket 230b. The shape of the edges at the rear surface 244b of the drive main rubber element 240b may be selected to contact the contours of the drive-side surface 226b when positioned in the drive-side cavity 227b of the middle bracket 220b, thus changing the progression of the compression torque roll restrictor. The contours of the drive-side surface 226b of the middle bracket 220 also can change the progression of the compression torque roll restrictor. As can be seen in FIG. 5B, the drive main rubber element 240b includes a sloped edge 241b contacting the inner edge SB of the drive-side cavity 227b. Furthermore, in FIG. 5B, the drive-side cavity 227b has a stepped construction corresponding to a stepped edge SB of the drive main rubber element 240b, the the stepped construction being about the elongated body 214. The stepped edge SB in the drive main rubber element 240b and the drive-side cavity 227a cooperate to result in a softer rubber element via less rubber being included, and via additional space for the drive main rubber element 240b to move. in the drive-side cavity 227b. This allows more stiffness and longer travel.

Referring to the example of FIG. 5C, the compression torque roll restrictor 200c includes a forward bracket 210c, a middle bracket 220c, and a rear bracket 230c disposed about the center axis $Z_c$, with the drive main rubber element 240c disposed between the forward bracket 210c and the middle bracket 220c, and the reverse main rubber element 250c disposed between the middle bracket 220c and the rear bracket 230c. The shape of the edges at the rear surface 244c of the drive main rubber element 240c may be selected to contact the contours of the drive-side surface 226c when positioned in the drive-side cavity 227c of the middle bracket 220c, thus changing the progression of the compression torque roll restrictor. The contours of the drive-side surface 226c of the middle bracket 220 also can change the progression of the compression torque roll restrictor. As can be seen in FIG. 5C, the outer edge of the drive-side cavity 227c has a raised construction to form a deeper well forming side contact surface Sc with a protrusion 245c for contacting the drive main rubber element 240c, which cooperates with the drive-side surface 226c to retain the drive main rubber element 240c within the drive-side cavity 227c of the middle bracket 220. These features cooperate to contain the drive main rubber element 240c during the displacement, increasing the stiffness more quickly.

Although the variations shown in the examples of FIGS. 5A-C alter the contours and arrangement between the drive main rubber element and the middle bracket, it is contemplated that similar adjustments can be made to the contours and arrangement between the reverse main rubber element and the middle bracket as well, and the previous discussion is not intended to be limiting. Similarly, the interaction of the contours of the drive main element and the forward bracket can similarly be modified to change the progression based on performance requirements, and similar alterations are contemplated for the interface of the drive main rubber element and the forward bracket. Additionally, the interaction of the contours of the reverse main element and the rear bracket can similarly be modified to change the progression based on performance requirements, and similar alterations are contemplated for the interface of the reverse main rubber element and the rear bracket.

Figure 6:
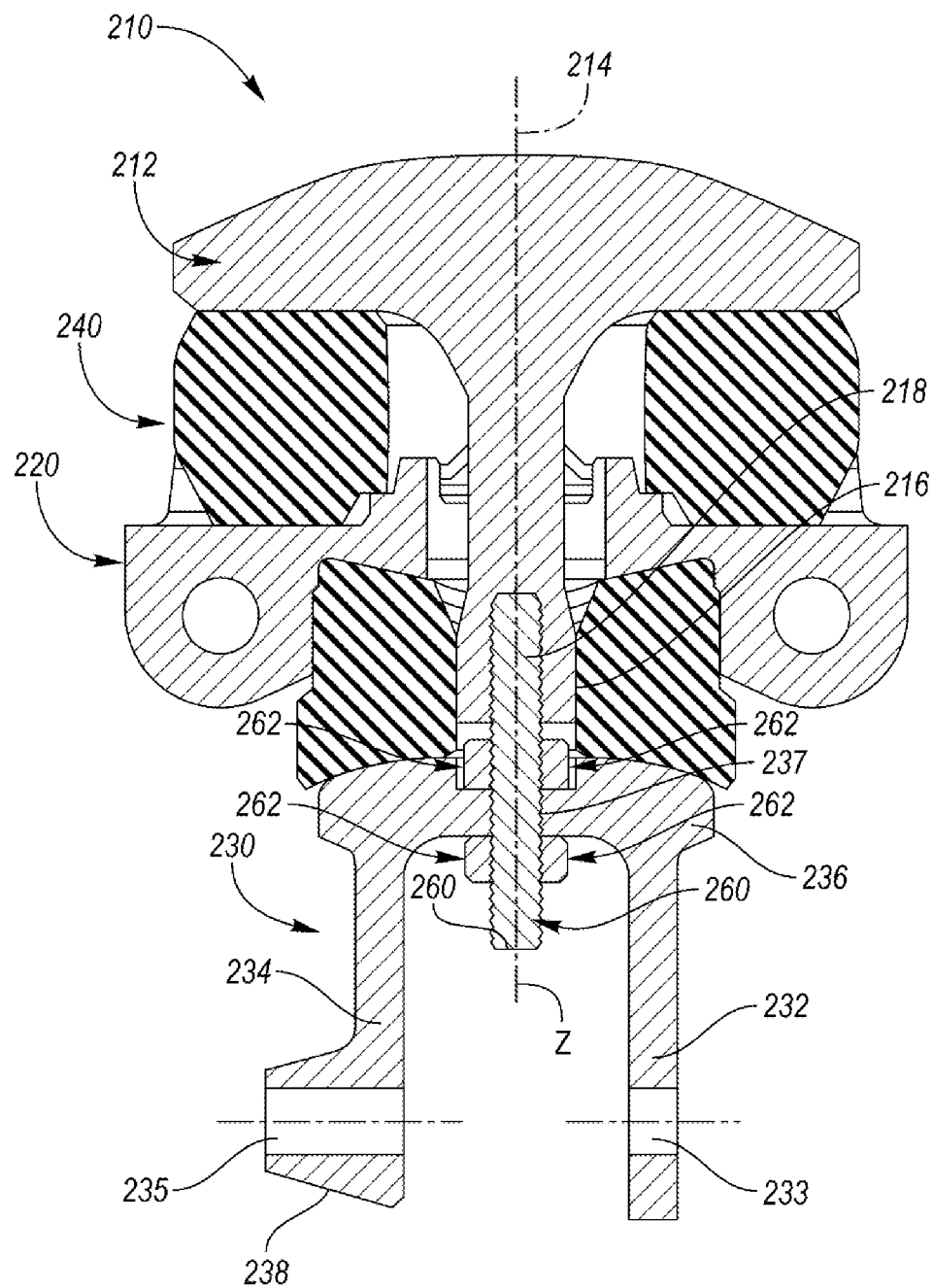
FIG. 6 is a cross-sectional view of a compression torque roll restrictor, according to another embodiment.

Referring to FIG. 6, the compression torque roll restrictor 200 is shown according to another embodiment. The compression torque roll restrictor 200 includes a forward bracket 210, a middle bracket 220, and a rear bracket 230 disposed about the center axis Z, with the drive main rubber element 240 disposed between the forward bracket 210 and the middle bracket 220, and the reverse main rubber element 250 disposed between the middle bracket 220 and the rear bracket 230. The compression torque roll restrictor 200 further includes a stud 260 molded into the distal end 216 of the forward bracket 210 and extending along the center axis Z and through the opening 237 in the base portion 236 of the rear bracket 230. The compression torque roll restrictor 200 includes nuts 262 positioned about the stud 260 on either side of the base portion 236 and configured to adjust the drive side and reverse size cavities based on the requirements of the vehicle design, such that the position can be tailored to the vehicle specifications without additional components. The nuts 262 generate a self-locking mechanism to prevent the rotation of the forward bracket 210 upon movement of the C-bracket. By utilizing the stud 260 and the nuts 262, the gap can be adjusted to accommodate various designs and requirements, without adding complexity to the components of the compression torque roll restrictor 200.

According to one or more embodiments, a compression torque roll restrictor with separate drive and reverse main rubber elements is provided. Each main rubber element is held in compression with respect to the brackets of the torque roll restrictor such that the construction of the torque roll restrictor is modular. Thus, the metal brackets and main rubber elements are easily interchangeable and modifiable such that they can be used in combination to achieve tailored characteristics required for a particular powertrains across various platforms.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A powertrain torque roll restrictor comprising:
   a first bracket having an elongated body defining a first bracket opening at a distal end and a central axis;
   a second bracket coaxial with and adjacent to the first bracket, the second bracket defining a second bracket opening receiving the elongated body such that the second bracket is positioned about the elongated body;
   a first rubber element positioned between the first bracket and the second bracket, the first rubber element having a drive compressed state between the first bracket and the second bracket upon travel in a drive direction;

a third bracket coaxial with and adjacent to the second bracket opposite from the first bracket, the third bracket defining a third bracket opening cooperable with the first bracket opening; and a second rubber element positioned between the second bracket and the third bracket, the second rubber element having a reverse compressed state between the second bracket and the third bracket upon travel in a reverse direction, wherein the third bracket is secured to the first bracket via a fastening element extending through the third bracket opening and into the first bracket opening defined in the elongated body, and the first rubber element is radially wider than the second rubber element.

2. The powertrain torque roll restrictor of claim 1, wherein the first rubber element has a hardness different from the second rubber element.

3. The powertrain torque roll restrictor of claim 1, wherein the second bracket has a first surface toward the first bracket and a second surface toward the third bracket, each of the first surface and the second surface defining a respective cavity for receiving the respective first and second rubber elements therein.

4. The powertrain torque roll restrictor of claim 3, wherein the first surface has an inner edge about the second bracket opening having a sloped surface adjacent to and contacting the first rubber element when in the drive compressed state.

5. The powertrain torque roll restrictor of claim 3, wherein the first surface has an inner edge about the second bracket opening having a stepped surface adjacent to and contacting the first rubber element when in the drive compressed state.

6. The powertrain torque roll restrictor of claim 3, wherein the first surface has an axially raised outer edge having a radially inward facing protrusion contacting the first rubber element.

7. The powertrain torque roll restrictor of claim 1, wherein the third bracket includes a base portion defining the third bracket opening and elongated members extending from opposing ends of the base portion.

8. The powertrain torque roll restrictor of claim 7, wherein the elongated members each define a respective coaxial fastener opening for receiving a fastener to secure the third bracket to a roll restrictor bracket.

9. A vehicle powertrain assembly comprising:
a transmission housing;
a vehicle sub-frame; and
a powertrain torque roll restrictor for securing the transmission housing to the vehicle sub-frame, the powertrain torque roll restrictor including
a first bracket having an elongated body defining a first bracket opening at a distal end and a central axis;
a second bracket coaxial with and adjacent to the first bracket, the second bracket defining a second bracket opening receiving the elongated body such that the second bracket is positioned about the elongated body, and defining attachment openings radially outward from the second bracket opening;
a first rubber element positioned and configured to be compressed between the first bracket and the second bracket;
a third bracket coaxial with and adjacent to the second bracket opposite from the first bracket, the third bracket defining a third bracket opening cooperable with the first bracket opening and secured to the first bracket via a fastening element extending through the third bracket opening and into the first bracket opening defined in the elongated body, and having a securing portion defining a fastener opening for receiving a fastener to secure the third bracket to the transmission housing;

a second rubber element positioned and configured to be compressed between the second bracket and the third bracket; and a roll restrictor bracket positioned between the third bracket and the transmission housing, the roll restrictor bracket having a first portion secured to the third bracket at the fastener opening, and a second portion secured to the transmission housing, wherein the second bracket is secured to the vehicle-subframe by fasteners disposed through the attachment openings.

10. The vehicle powertrain assembly of claim 9, wherein the first rubber element has a hardness different from the second rubber element.

11. The vehicle powertrain assembly of claim 9, wherein the second bracket has a first surface toward the first bracket and a second surface toward the third bracket side, each of the first surface and the second surface defining a respective cavity for receiving the respective first and second rubber elements therein.

12. The vehicle powertrain assembly of claim 11, wherein the first surface has an inner edge about the second bracket opening having a sloped surface adjacent to and contacting the first rubber element when compressed.

13. The vehicle powertrain assembly of claim 11, wherein the first surface has an inner edge about the second bracket opening having a stepped surface adjacent to and contacting the first rubber element when compressed.

14. The vehicle powertrain assembly of claim 11, wherein the first surface has an axially raised outer edge having a radially inward facing protrusion contacting the first rubber element.

15. The vehicle powertrain assembly of claim 9, wherein the third bracket includes a base portion defining the third bracket opening and elongated members extending from opposing ends of the base portion.

16. A powertrain torque roll restrictor comprising:
a first bracket having an elongated body with a distal end and a stud molded to the elongated body extending from the distal end, the first bracket and stud defining a center axis;
a second bracket coaxial with and adjacent to the first bracket, the second bracket defining a second bracket opening receiving the elongated body such that the second bracket is positioned about the elongated body;
a first rubber element positioned and configured to be compressed between the first bracket and the second bracket;
a third bracket coaxial with and adjacent to the second bracket opposite from the first bracket, the third bracket defining a third bracket opening sized to receive the stud of the first bracket; and
a second rubber element positioned and configured to be compressed between the second bracket and the third bracket,
wherein the third bracket is secured to the stud via fastening elements positioned axially on either side of the third bracket such that the stud extends through the third bracket opening to secure the third bracket to the first bracket.

17. The powertrain torque roll restrictor of claim 16, wherein the first rubber element has a hardness different from the second rubber element.

18. The powertrain torque roll restrictor of claim 16, wherein the second bracket has a first surface toward the first bracket and a second surface toward the third bracket, each of the first surface and the second surface defining a respective cavity for receiving the respective first and second rubber elements therein.

* * * * *